United States Patent [19]
Dezonno

[11] Patent Number: 5,831,665
[45] Date of Patent: Nov. 3, 1998

[54] VIDEO SWITCHING SYSTEM, VIDEO COMMUNICATIONS SYSTEM AND METHOD FOR AUTOMATICALLY ESTABLISHING VIDEO COMMUNICATIONS USING A TELEPHONIC SWITCH

[75] Inventor: Anthony J. Dezonno, Downers Grove, Ill.

[73] Assignee: Rockwell International Corporation, Costa Mesa, Calif.

[21] Appl. No.: 590,645

[22] Filed: Jan. 24, 1996

[51] Int. Cl.$^6$ .................................................. H04N 7/14
[52] U.S. Cl. .......................... 348/14; 379/93.14; 379/265
[58] Field of Search .............................. 379/93.14, 93.17, 379/93.26, 91.01, 91.02, 265, 266; 348/14–19

[56] References Cited

U.S. PATENT DOCUMENTS

| | | | |
|---|---|---|---|
| 5,555,297 | 9/1996 | Ochy et al. ............................ | 379/136 |
| 5,557,667 | 9/1996 | Bruno et al. ............................ | 379/201 |

*Primary Examiner*—Curtis A. Kuntz
*Assistant Examiner*—Melur Ramakrishnaiah
*Attorney, Agent, or Firm*—Welsh & Katz, Ltd.

[57] ABSTRACT

A video switching system 108 automatically establishes video communications between an agent terminal 110 and a video communications device 104. A telephonic switch, such as an automatic call distributor (ACD) 102, selects which agent terminal 110 receives the video communications and generates reports relating to the video communications. A programmable switch 105 receives an initial request from the video communications device 104 to establish video communications. A computer system 112 detects the initial request and instructs the ACD 102 to select the agent terminal 110 which is to receive the video communications. The ACD 102 selects the agent terminal 110, or an agent associated with the agent terminal 110, using known methods and transmits the selected agent terminal 110 to the computer system 112. The computer system 112 instructs the programmable switch 105 to route the video communications to the selected agent terminal 110. When the ACD 102 receives the instructions to select the agent terminal 110, the ACD 102 begins to collect information relating to the video communications. The computer system 112 detects when the video communications has ended and notifies the ACD 102. In response, the ACD 102 stops collecting information, such as communication time, and makes the agent terminal 110 available.

17 Claims, 1 Drawing Sheet

VIDEO SWITCHING SYSTEM, VIDEO COMMUNICATIONS SYSTEM AND METHOD FOR AUTOMATICALLY ESTABLISHING VIDEO COMMUNICATIONS USING A TELEPHONIC SWITCH

BACKGROUND OF THE INVENTION

The present invention is related to a system for automatically establishing video communications between a video communications device and a remote agent and, more particularly, to a video switching system, video communications system and method for automatically establishing video communications between a video communications device and a remote agent in response to a request from the video communications device wherein a telephonic switch selects which remote agent is to receive the video communications and provides reporting capabilities relating to the video communications.

Telephonic switches are increasingly being used by businesses to automatically route incoming customer calls to available agents. One common type of telephonic switch is an automatic call distributor (ACD) which generally includes a multiport switch controlled by a central processing unit to interconnect external telephonic units of an external telephonic network with internal telephonic units. An example of such an ACD is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

One feature of numerous telephonic switches is the ability to intelligently select which agents receive certain incoming telephone calls. This selection process may be based on information provided by the caller, the skills of the individual agents, automatic number identification (ANI) information, dialed number identification service (DNIS) information or other information. Complex software routines stored in the telephonic switch use this information to properly route calls.

Another advantageous feature is the ability of telephonic switches to acquire, process and report information concerning different aspects of switch activity. Typically, a data display terminal generates visual representations of the information. Based on this information, management and supervisory personnel are able to evaluate the call activity within the switch and, if necessary, make changes for more efficient switch operation.

Telephonic switches further provide for predictive outdialing wherein the switch automatically calls an individual at a certain time and telephone number. When the individual answers the outdialed call, the switch connects the individual to a selected agent.

Video communications devices are increasingly being used to transmit video images between two locations. Such devices permit individuals to talk to each other while concomitantly viewing the other party. These devices are particularly attractive in businesses having security concerns, such as banks and the like.

Most current telephonic switches are unfortunately unable to handle video communications. Consequently, the above features, such as intelligent agent selection, extensive reporting capability and outbound dialing, are not available for video communications through a conventional telephonic switch.

Accordingly, there is a need for an improved video switching system which automatically establishes video communications between a video communications device and an agent and which utilizes the aforementioned features of a telephonic switch by having the telephonic switch intelligently select the agent to receive the video communications and generate reports relating to the video communications.

SUMMARY OF THE INVENTION

This need is met by the video communications system, video switching system and method of the present invention for automatically establishing video communication between a video communications device and an agent terminal wherein a telephonic switch is used to select an agent to receive the video communications and to generate reports relating to the video communications.

In accordance with one aspect of the present invention, a video switching system for automatically establishing video communications between one of a plurality of agent terminals and a video communications device is provided. The video switching system is responsive to a telephonic switch. A programmable switch receives an initial request from the video communications device to establish video communications. A computer system detects receipt of the initial request by the programmable switch and instructs the programmable switch to route the video communications to the one of the plurality of agent terminals.

In accordance with another aspect of the present invention, a video communications system for automatically establishing video communications between a video communications device and one of a plurality of agent terminals is provided. The video communications system comprises a programmable switch for receiving an initial request from the video communications device to establish the video communications. A telephonic switch, such as an automatic call distributor, selects the one of the plurality of agent terminals to receive the video communications in response to the initial request. A computer system then instructs the programmable switch to route the video communications to the selected one of the plurality of agent terminals.

In accordance with yet another aspect of the present invention, a method for automatically establishing video communications between an agent terminal and a video communications device is provided. The method comprises the steps of: receiving an initial request from the video communications device to establish the video communications; selecting the agent terminal to receive the video communications in response to the initial request; and instructing a programmable switch to route the video communications to the agent terminal.

These and other features and advantages of the present invention will become apparent from the following detailed description, the accompanying drawing and the appended claims.

DETAILED DESCRIPTION OF THE INVENTION

Figure 1:
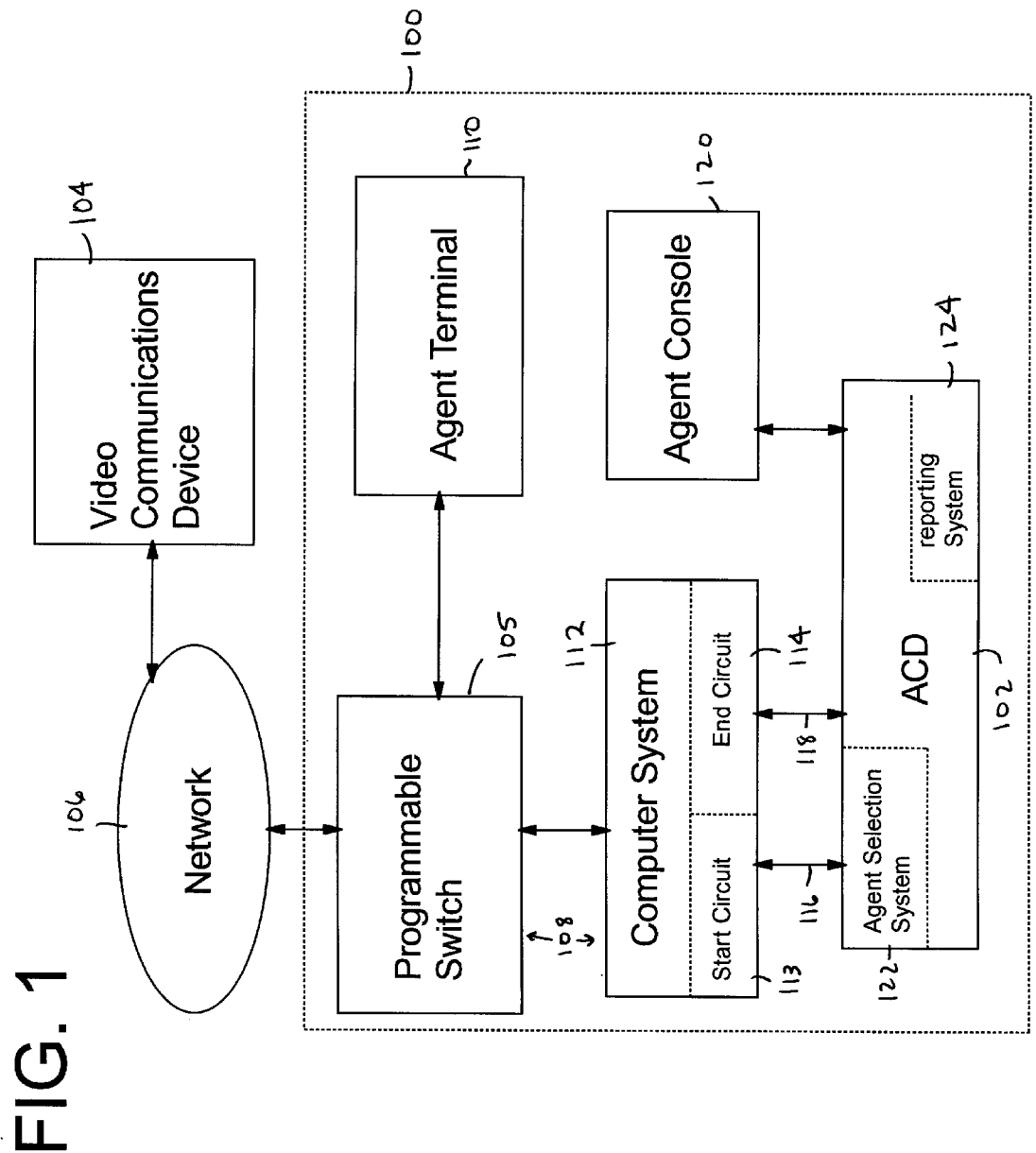
FIG. 1 is a block diagram of a video communications system using an automatic call distributor in accordance with the present invention.

A video communications system 100 which employs a telephonic switch, such as an automatic call distributor (ACD) 102, to automatically establish video communications with a video communications device 104, which is commonly known as a KIOSK, in accordance with the present invention is shown in FIG. 1. The video communications are established through a programmable switch and a conventional network 106. An integrated services digital network (ISDN) programmable switch which may be advantageously employed in the present invention is manufactured by the American Telephone & Telegraph Corporation located in New York, N.Y. The structure and philosophy of networks for transmitting video communications are well known and, as such, will not be further described herein.

A video switching system 108, which is comprised of the programmable switch 105 and a computer system 112, establishes video communications between an agent terminal 110 and the video communications device 104. In response to instructions received from the ACD 102, the computer system 112 prompts the programmable switch 105 to establish communications between the video communications device 104 and the agent terminal 110. The computer system 112 provides the information received from the programmable switch 105 to the ACD 102 regarding the video communications.

The computer system 112 includes a switch circuit for communicating with the ACD 102. The switch circuit comprises a start circuit 113 for indicating to the ACD 102 that video communications have been requested by placing a dedicated Ti line 116 in an off hook condition. In response to the off hook condition, the ACD 102 selects an agent terminal, or agent, to receive the video communications and transmits the selected agent terminal to the computer system. Additionally, the ACD 102 begins to store information relating to the video communications for later reporting. An end circuit 114 in the switch circuit signals to the ACD 102 when the video communications have ended by placing the dedicated T1 line 114 in an on hook condition. As those skilled in the art will readily comprehend, the communications between the ACD. 102 and the computer system 112 can be performed over a dedicated T1 line 116, as just described, or any other connecting line 118.

In a typical call switching system, the ACD 102 transfers a telephone call to an agent console 120 based on which agent is located at the agent console 120. Although the ACD 102 is typically connected to more than one agent console 120, only one agent console is shown for ease of description. Current call switching systems have further eliminated the agent console 120 by having the call directly routed to the agent terminal 110 associated with an agent. The agent terminal 110 typically includes a voice card for provides voice communications with the agent and a video card for providing video communications with the agent. Agent consoles 120 are well known and will not be further discussed. Moreover, the present invention may be advantageously employed in call switching systems both with and without agent consoles 120.

The ACD 102 comprises an agent selection system 122 for selecting an available agent to receive a call. Methods for selecting an agent to receive a call based on ANI information, DNIS information, agent skills and the like are well known. A reporting system 124 associated with the ACD 102 generates reports detailing switch operation and provides these reports to an appropriate display device, such as an electronic display or printer.

The present invention provides a system and method for automatically establishing video communications between the agent terminal 110 and the video communications device 104 which utilizes the agent selection and reporting features of the ACD 102. In operation, an individual at the video communications device 104 typically enters a specified request to establish video communications with an agent. A banking customer, for example, may be requesting a video conference with a bank agent from an automatic teller machine (ATM). In response, the video communications device 104 sends an initial request over the network 106 to the programmable switch 105 requesting video communications.

The initial request contains destination information, such as ANI information, identifying the video communications device 104. This destination information is sent to the computer system 112 in a call arrival message by the programmable switch 105. The computer system 112 recognizes that a video communications request is being made and, in response thereto, places the T1 line 116 in an off hook condition thus simulating an incoming video call to the ACD 102. Since the T1 line 116 is dedicated to video communications, the ACD 102 recognizes that placing the T1 line 116 off hook means that video communications are being requested. As those skilled in the art will readily recognize, if a nondedicated line 118 is used for communications between the computer system 112 and the ACD 102, the computer system 112 notifies the ACD 102 that a video communications request is being made by using a specific code or number sequence.

More particularly, the switch circuit 114 signals to the ACD 102 that video communications are being established, such as by taking the TI line 116 off hook or indicating by a specific sequence or the like that the simulated call is to be routed to an agent who can answer video calls (video agent). In response, the agent selection system 122 selects one of the agent terminals, or agents, to receive the video communications. The ACD 102 places this simulated call in queue such that the reporting system 124 may log data relating to the video communications.

The agent selection means 122 selects an agent to handle the simulated call using predefined criteria, such as which agents handle video calls, which agents are available and the like. When the agent selection means 122 has selected an agent, the ACD 102 notifies the computer system 112 which agent terminal was selected. In turn, the computer system 112 sends an establish communications signal to the programmable switch 105 instructing the switch 105 to route the video communications to the selected agent terminal.

As should be readily understood by those skilled in the art, the video communications system 100 contains a plurality of agent terminals, each of which is associated with an agent. Consequently, by selecting an agent to receive the video communications, the ACD 102 is, in effect, selecting an agent terminal to receive the video communications. The ACD 102 may indicate which agent terminal (by an agent terminal identification number) is to receive the video communications. If the ACD 102 indicates which agent (by an agent identification number) is to received the video communications, the computer system 112 would then identify which agent terminal is associated with the selected agent in any of a number of well known methods. For instance, each agent may log on with an unique identification number and agent terminal identification number. The computer system 112 thereafter stores the entered identification numbers to match agents and agent terminals. Such methods are well known in the art and will not be further discussed herein.

The programmable switch 105 routes the video communications to the selected agent terminal 110. As those skilled in the art will readily comprehend, the agent selection signal and the establish communications signal will likely contain an address code representative of the specific agent terminal 110 selected to receive the video communications. The agent terminal 110 contains a conventional video card which provides the video communications with the agent. Although video cards are well known, the video card currently contemplated for use in the present invention is manufactured by the Intel Corporation in Santa Clara, Calif.

Video communications are consequently automatically established between the agent terminal 110 selected by the ACD 102 and the video communications device 104. The ACD 102 continues to monitor the simulated call received from the computer system 112. The reporting system 124 detects and stores information relating to the video communications established by the computer system 112. Consequently, management and supervisory personnel are able to evaluate the video communications activity and, if necessary, make changes for more efficient operation using the extensive reporting capabilities of the ACD 102.

When the video communications are terminated either by the agent or the customer at the KIOSK, the programmable switch 105 sends a release message to the computer system 112. The computer system 112 then transmits this information to the ACD 102 by placing the T1 line 116 on hook or by sending an appropriate ACD release message. In response, the ACD 102 disconnects the simulated video call and the reporting system 124 detects that the video call has ended. The ACD 102 removes the video call from the agent and can thereafter route other calls to the agent.

In accordance with the present invention, a method for automatically establishing video communications between the agent terminal 110 and the video communications device 114 is provided. The method comprises the steps of receiving an initial request from the video communications device 114 to establish the video communications; selecting the agent terminal 110 to receive the video communications in response to the initial request; and instructing the programmable switch 105 to route the video communications to the agent terminal 110. Preferably, the step of selecting comprises the step of using the telephonic switch 102 to select the agent terminal 110 to receive the video communications. The step of receiving an initial request may comprise the step of detecting the initial request by the computer system 112. In which case, the step of selecting the agent terminal 110 comprises the step of placing the dedicated TI line 116 in an off hook condition by the computer system 112 in response to the initial request to instruct the telephonic switch 102 to select the agent terminal 110.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A video switching system for automatically establishing video communications between one of a plurality of agent terminals and a video communications device, the video switching system being responsive to a telephonic switch, the video switching system comprising:

a programmable switch for receiving an initial request from the video communications device to establish video communications; and a computer system operatively interposed between the programmable switch and the telephonic switch for detecting receipt of the initial request by the programmable switch and for instructing the programmable switch to route the video communications to the one of the plurality of agent terminals.

2. The video switching system as recited in claim I wherein the computer system comprises a switch circuit for requesting that the telephonic switch select the one of the plurality of agent terminals to receive the video communications in response to the initial request, and wherein, the computer system instructs the programmable switch to route the video communications based on the selected one of the agent terminals.

3. The video switching system as recited in claim 2 wherein the switch circuit comprises a start circuit for placing a dedicated T1 line in an off hook condition in response to the initial request.

4. The video switching system as recited in claim 3 wherein the switch circuit comprises an end circuit for placing the dedicated TI line in an on hook condition when the video communications are terminated.

5. A video communications system for automatically establishing video communications between a video communications device and one of a plurality of agent terminals comprising:

a programmable switch for receiving an initial request from the video communications device to establish the video communications;

a telephonic switch for selecting the one of the plurality of agent terminals to receive the video communications in response to the initial request; and a computer system operatively interposed between the programmable switch and telephonic switch for instructing the programmable switch to route the video communications to the selected one of the plurality of agent terminals.

6. The video communications system as recited in claim 5 wherein the telephonic switch comprises a reporting system for reporting information relating to the video communications.

7. The video communications system as recited in claim 5 comprising:

a dedicated T1 line connecting the telephonic switch and the computer system, and wherein, the computer system places the TI line in an off hook condition to instruct the telephonic switch to select the one of the plurality of agent terminals and places the T1 line in an on hook condition when the video communications are terminated.

8. The video communications system as recited in claim 5 wherein the programmable switch comprises an integrated services digital network programmable switch.

9. The video communications system as recited in claim 5 wherein the telephonic switch is an automatic call distributor.

10. A method for automatically establishing video communications between an agent terminal of an agent and a video communications device, the method comprising the steps of:

receiving by a programmable switch an initial request from the video communications device to establish the video communications:

transferring the initial request to an automatic call distributor of the agent;

selecting by the automatic call distributor the agent terminal to receive the video communications in response to the initial request; and instructing the programmable switch to route the video communications to the agent terminal.

11. The method as recited in claim 10 wherein the step of selecting comprises the step of:

using a telephonic switch to select the agent terminal to receive the video communications.

12. The method as recited in claim 11 wherein the step of receiving an initial request comprises the step of:

detecting the initial request by a computer system, and wherein the step of selecting the agent terminal comprises the step of:

placing a dedicated T1 line in an off hook condition by the computer system in response to the initial request to instruct the telephonic switch to select the agent terminal.

13. The method as recited in claim 10 comprising the steps of:

detecting information relating to the video communications; and reporting the information.

14. The method as recited in claim 13 wherein the step of reporting comprises using a telephonic switch to report the information.

15. The method as recited in claim 14 wherein the step of using the telephonic switch comprises the steps of:

detecting the initial request by a computer system;

instructing the telephonic switch to begin recording the information relating to the video communications when the computer system detects the initial request;

detecting when the video communications have ended by the computer system; and instructing the telephonic switch to terminate recording the information relating to the video communications when the computer system detects that the video communications have ended.

16. The method as recited in claim 15 wherein the step of instructing the telephonic switch to begin recording comprises the step of placing a dedicated T1 line in an off hook condition.

17. The method as recited in claim 10 wherein the step of instructing a programmable switch to route the video communications to the agent terminal comprises the step of instructing an integrated services digital network programmable switch to route the video communications.

* * * * *